United States Patent [19]

Yamaguchi et al.

[11] Patent Number: 4,856,563

[45] Date of Patent: Aug. 15, 1989

[54] METHOD AND APPARATUS FOR FILLING LIQUID INTO CONTAINERS

[75] Inventors: Shogo Yamaguchi; Kazunori Araki; Hisashi Tazuke; Masayuki Murasaki; Hirofumi Ito, all of Nagoya, Japan

[73] Assignee: Mitsubishi Jukogyo Kabushiki Kaisha, Tokyo, Japan

[21] Appl. No.: 91,955

[22] Filed: Sep. 1, 1987

[30] Foreign Application Priority Data

Sep. 8, 1986 [JP] Japan ........................ 61-209686

[51] Int. Cl.⁴ ........................ B65B 1/04; G01G 13/00

[52] U.S. Cl. ........................ 141/1; 141/83; 141/129; 177/64

[58] Field of Search ........................ 141/1, 83, 129; 177/1, 177/60, 64

[56] References Cited

U.S. PATENT DOCUMENTS

| | | | |
|---|---|---|---|
| 2,700,495 | 1/1955 | Jacobs | 226/22 |
| 2,825,190 | 3/1958 | Heald | 53/21 |
| 2,988,450 | 6/1961 | Bulatkin | 99/79 |
| 3,415,294 | 12/1968 | Kelly | 141/1 |
| 4,274,455 | 6/1981 | Simons | 141/1 |
| 4,276,913 | 7/1981 | Szonntagh | 141/1 |
| 4,481,985 | 11/1984 | Bruder et al. | 141/1 |

FOREIGN PATENT DOCUMENTS 3202655 4/1983 Fed. Rep. of Germany .

*Primary Examiner*—J. R. Scott

*Attorney, Agent, or Firm*—Wenderoth, Lind & Ponack

[57] ABSTRACT

A predetermined amount of liquid is to be filled into a container. The weight of liquid contained within a metering container is measured by a balance and a filling control valve provided at an outlet of the metering container is controlled in response to a signal issued from the weighing balance. Thereby a predetermined amount of the liquid can be filled from the metering container into the container. A control unit opens and closes the filling control valve and a feed control valve connected to a liquid feed source in response to a signal issued from the weighing balance. An inlet of the metering container is connected via a flexible pipe to an outlet of the feed control valve, and an outlet of the metering container is connected via a flexible pipe to an inlet of the filling control valve.

6 Claims, 2 Drawing Sheets

METHOD AND APPARATUS FOR FILLING LIQUID INTO CONTAINERS

BACKGROUND OF THE INVENTION

1. Field of the Invention

The present invention relates to a technique for filling liquid into bottles, cans or the like, particularly for use in a food filling machine, but also generally applicable for filling liquids other than foods, such as medical supplies, cleaning materials, oils, etc.

2. Description of the Prior Art

Known techniques for filling a predetermined amount of liquid food into a container such as a bottle, a can or the like include, (1) a piston type system for filling a predetermined volume, and (2) a system for filling a predetermined weight by measuring a gross weight including the weight of the container.

(1) The piston type fixed volume filling system of the prior art involves the following problems:

(a) Adjustment of the filled volume is achieved by adjusting a stroke of a piston, but the adjustable range is limited, and in the case of a multiple system it is necessary to finely adjust the individual piston strokes.

(b) In order to enhance the filling flow rate, it is necessary to speed up suction and ejection cycles, and thus filling precision is changed or degraded under the influence of material properties (density, viscosity, etc.) of the filled liquid. In addition, if the operation cycles are quickened more than a predetermined degree, then problems arise such that generation of cavitation upon suction and inertia of liquid flow become remarkable and cut-off of liquid is unstable. Thereby, it becomes impossible to fill a fixed volume.

(c) In the case where it is desired to fill a predetermined weight of liquid into a container such as a bottle, a can or the like, if the temperature of the liquid is varied, then the density of the liquid changes and hence the filled weight is varied.

(2) The system for filling a predetermined weight by measuring a gross weight including the weight of the container involves the following problems:

(d) In the case where it is desired to fill a relatively small weight into a bottle, a can or the like, since the liquid is weighed as a part of the gross weight including the weight of the container, precision of determining the net filled weight is degraded.

(e) In order to realize high efficiency (large capability) in metering and filling, after a container such as a bottle, a can or the like has been placed on a weighing section, stilling of the weighing section is necessary, and the time required for such stilling results in inefficient operation. Also it is necessary to pay attention so that any excessive weight or dynamic load will not be applied to the weighing section, and a handling mechanism which can achieve positioning of the bottle, a can or the like is necessary. To fulfil these requirements is especially difficult for a relatively small-sized container to be filled.

SUMMARY OF THE INVENTION

It is therefore one object of the present invention to provide a novel method for controllably filling liquid at a high precision and at an increased filling speed regardless of changes of material properties of the liquid.

Another object of the present invention is to provide an apparatus for efficiently practicing the above-mentioned novel method.

According to one feature of the present invention, there is provided a method for filling liquid, in which the weight of liquid contained within a metering container placed on a weighing balance is measured by the weighing balance, and a filling control valve provided at an outlet of the metering container is controlled in response to a signal issued from the weighing balance, whereby a predetermined amount of liquid can be filled into a container such as a bottle, a can or the like.

According to another feature of the present invention, there is provided an apparatus for filling liquid, and including a metering container placed on a weighing balance, a filling control valve provided at an outlet of the meter container, a control unit for opening and closing the filling control valve in response to signals issued from the weighing balance, flexible pipes having first ends connected respectively to an inlet and the outlet of the metering container, a feed control valve provided upstream of the inlet flexible pipe, the filling control valve being disposed downstream of the outlet flexible pipe, and a conveyor for containers such as bottles, cans or the like disposed beneath the filling control valve.

According to the present invention, the liquid to be filled into a desired container such as a bottle, a can or the like is fed from a liquid feed source to the metering container placed on the weighing balance, and thereafter the liquid is ejected from the metering container through its outlet and the filling control valve, while the weight of the liquid remaining in the metering container is monitored, by opening and closing the filling control valve in response to signals issued from the weighing balance so that a precisely desired weight of liquid can be ejected from the metering container and filling into the desired container. In one mode of operation, feeding and ejection of liquid to an from the metering container are effected each time each container is filled with the liquid, but in another mode of operation, feeding of liquid to the metering container is effected only at the beginning of a filling operation for a number of containers, and ejections of the liquid from the metering container are effected intermittently a plurality of times until the liquid remainder in the metering container becomes too little to fill one container, whereby filling efficiency as well as filling precision can be further enhanced.

The above-mentioned and other objects, features and advantages of the present invention will become more apparent by reference to the following description of preferred embodiments of the invention taken in conjunction with the accompanying drawings.

DESCRIPTION OF THE PREFERRED EMBODIMENTS

Figure 1:
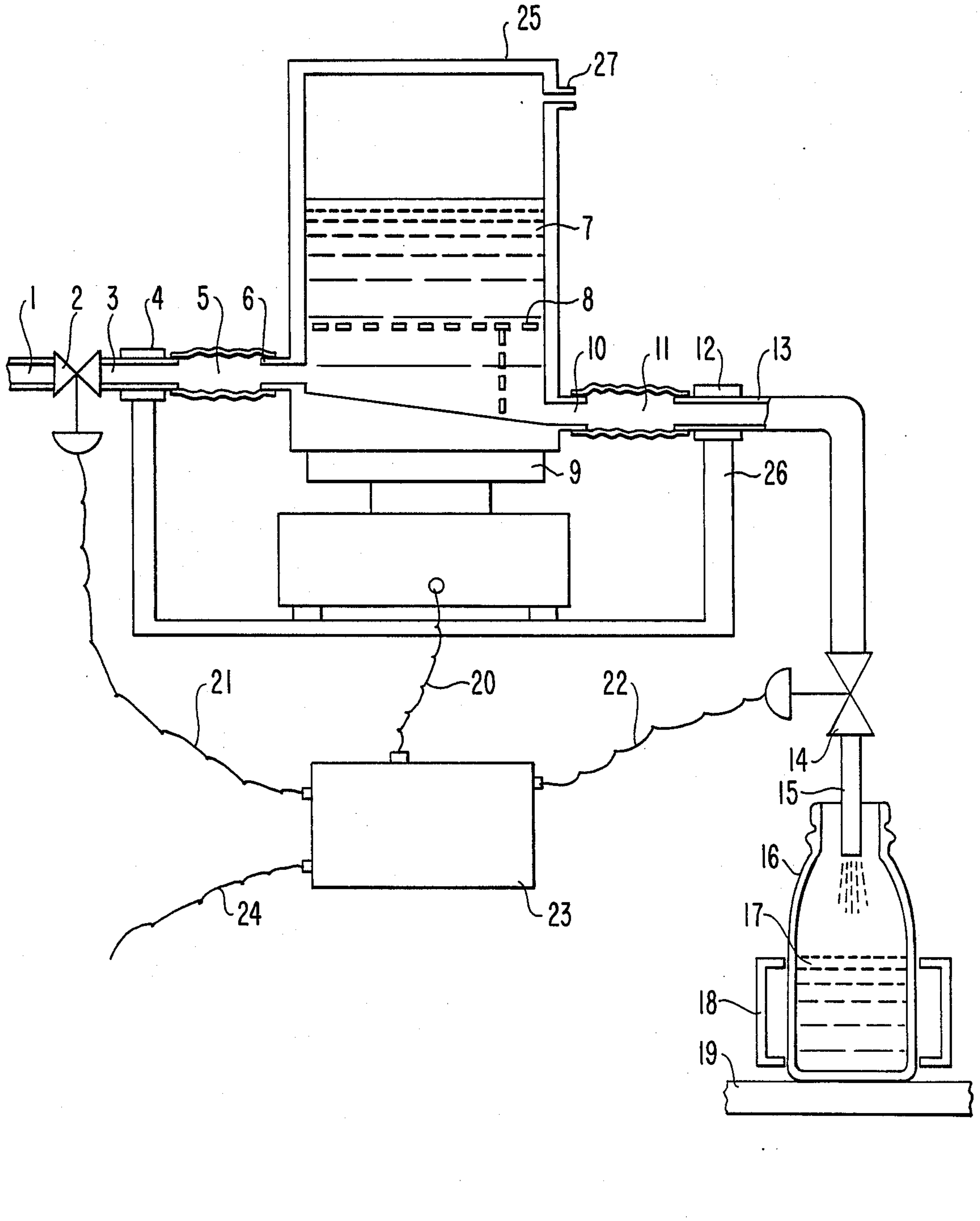
FIG. 1 is a schematic view showing one preferred embodiment of the liquid filling apparatus according to the present invention.

One preferred embodiment of a liquid filling apparatus according to the present invention is schematically shown in FIG. 1, in which reference numeral 1 designates a liquid feed port to which the liquid to be filled is supplied from a liquid feed source not shown. Reference numeral 2 designates a feed control valve which is an electrically or pneumatically operated ON-OFF valve or regulating valve. Reference numeral 3 designates a feed pipe, numeral 4 designates a pipe fixing member, numeral 5 designates a flexible pipe, and numeral 6 designates a liquid inlet for a metering container 25. Reference numeral 7 designates liquid to be filled which is stored within the metering container 25. Reference numeral 8 designates baffle plates, which achieve prevention of waving of the liquid 7 to be filled within the metering container 25 and prevention of swirling of the liquid 7 to be filled when it flows out of a liquid outlet 10. Reference numeral 9 designates a weighing balance or scale which is, for example, an electronic balance for detecting a sum of package weight of the metering container 25, the baffle plate 8 and the like, plus the net weight of the liquid 7 to be filled that is in the metering container 25.

Reference numeral 11 designates a flexible pipe, numeral 12 designates a pipe fixing member, and numeral 13 designates an outlet pipe. Reference numeral 26 designates a frame which serves to fixedly mount the weighing balance 9, the feed pipe 3 and the outlet pipe 13. Outer ends of the respective flexible pipes 5 and 11 are connected respectively to the feed pipe 3 and the outlet pipe 13, and inner ends of the respective flexible pipes 5 and 11 are respectively connected to the liquid inlet 6 and the liquid outlet 10 of the metering container 25. In order that an excessive weight is not loaded onto the weighing balance 9 via the fixing members 4 and 12, the mounting positions on the fixed side of the flexible pipes 5 and 11 can be adjusted by adjusting means not shown.

More particularly, although the flexible pipes 5 and 11 are so soft that even if a table of the weighing balance 9 is somewhat (for instance, by 0.2–0.5 mm) displaced by loading, elastic stresses caused by deformation of the flexible pipes 5 and 11 will not influence the measured weight, in order further to surely prevent such influence, the mounting positions on the fixed sides of the flexible pipes 5 and 11 can be rectified in response to a weight signal issued from the weighing balance 9 as controlled by a control unit 23 which will be explained later.

Reference numeral 14 designates a filling control valve, which is an electrically or pneumatically operated ON-OFF valve or regulating valve (having an adjustable opening angle of a valve).

Reference numeral 15 designates a filling nozzle which is, in some cases, associated with an elevating and lowering mechanism not shown, depending upon necessity. Reference numeral 16 designates a container such as a bottle, a can or the like, and numeral 17 designates liquid to be filled which has been filled into the container 16. Reference numeral 18 designates a holding member or a part for positioning for the container 16, and numeral 19 designates conveying means such as, for example, a conveyor for conveying a plurality of containers 16.

The containers 16 are conveyed to and from a predetermined position, that is, a position right under the filling nozzle 15 by the conveying means 19 while held by respective holding members 18, or alternatively, after they have been conveyed to an approximate position by the conveying means 19, they are positioned at the position right under the filling nozzle 15 by the positioning or holding member 18.

Metering container 25 is of the sealed (pressurized) type or of the semi-sealed (atmospheric pressure) type.

Reference numeral 20 designates a weight signal transmission line for transmitting a signal representing a weight detected by the weighing balance 9 to the control unit 23. Reference numeral 21 designates a signal line for electrically or pneumatically opening and closing the feed control valve 2, and numeral 22 designates a signal line for opening and closing or regulating the filling control valve 14 with an electric or pneumatic signal. Reference numeral 24 designates an external signal line, which transmits, for example, a filled amount abnormal signal or a signal for correcting an excess or shortage of a filled amount, or a signal for automatically setting a target filled amount externally, from an apparatus not shown to the control unit 23.

Now, operations of the apparatus shown in FIG. 1 will be explained with reference to FIGS. 2 and 3.

Figure 2:
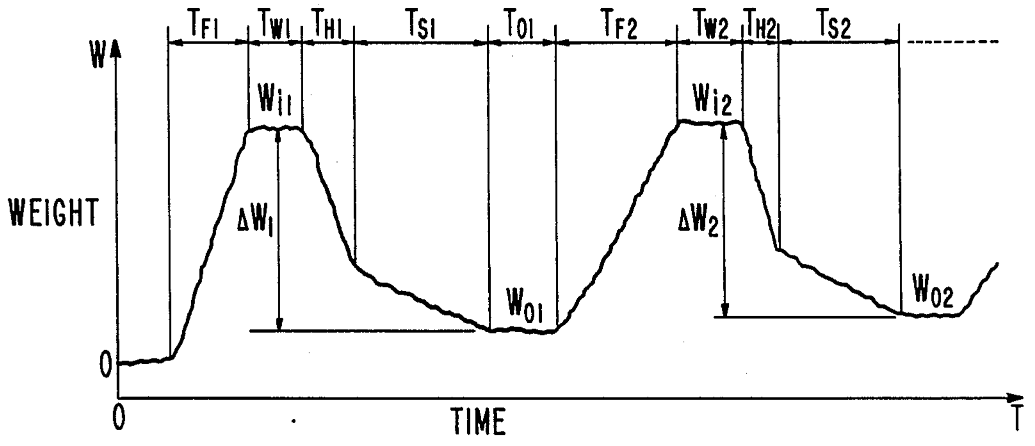
FIG. 2 is a diagram showing a first preferred embodiment of a method for filling liquid according to the present invention by making use of the apparatus shown in FIG. 1.

(1) FIG. 2 illustrates a method in which a predetermined weight of liquid is filled into the metering container 25 each time a container 16, such as a bottle, a can or the like, is brought into or out of a filling position.

At first, the feed control valve 2 is opened and the liquid 7 to be filled is fed to the metering container 25 until a measured weight amounts to $w_{i1}$ during a time period $T_{F1}$. Here, the correct weight $W_{i1}$ is stored in the control unit 23. During this period, the container 16 is correctly positioned right under the filling nozzle 15, and after a timer period $T_{W1}$, the filling control valve 14 is opened at a sufficiently large valve opening angle and the liquid 7 to be filled is quickly filled at a large flow rate either for a predetermined period $T_{H1}$ or until a weight detected by the weighing balance 9 becomes close to a predetermined weight. Subsequently, the filling control valve 14 is held at a small valve opening angle, so that the liquid 7 to be filled may be slowly filled for a time period $T_{S1}$ (See FIG. 2) at such a small flow rate that the weight measured by the weighing balance 9 can be maintained with sufficient precision. Just before the weight measured by the weighing balance 9 becomes a predetermined value $W_{O1}$, that is, just before a target filled weight $\Delta W_1 (= W_{i1} - W_{O1})$ is filled into the container 16, the filling control valve 14 is fully closed at appropriate timing or at a timing corresponding to a weight changing rate in the time period $T_{S1}$, and then the filling of a predetermined weight of liquid 17 to be filled into the container 16 is completed. Next, the container 16 which has been filled is removed to the next step of the process during a time period $T_{O1}$, and the next container 16 is brought in during that time period that new liquid 7 to be filled is fed to the metering container 25, i.e. during a time of $T_{F2}$, in a similar manner to that described above, until a weight measured by the weighing balance 9 equals $W_{i2}$ (See FIG. 2). Subsequently, in a successive manner, filling of the container with the liquid 7 is repeated for each successive container 16 that is supplied.

The filling control valve 14 can operate only when the container 16 is present under the filling nozzle 15. More particularly, the control is effected by transmitting a container detection signal issued from a container sensor not shown through signal line 24 to the control unit 23.

When the measured weight of the liquid 7 to be filled before the start of each filling operation, such as $W_{i1}$, $W_{i2}$, etc., is less than a predetermined weight to be filled in each container, the filling control valve 14 will not operate, and if necessary, an alarm can be issued at the same time. Furthermore, the control unit 23 can store the filled weight $\Delta W_1$, $\Delta W_2$, etc. in a memory each time the filling of a container 16 is effected. Thereby the filling operations can be monitored, and if necessary, the filled weight can be transmitted to an external apparatus.

Figure 3:
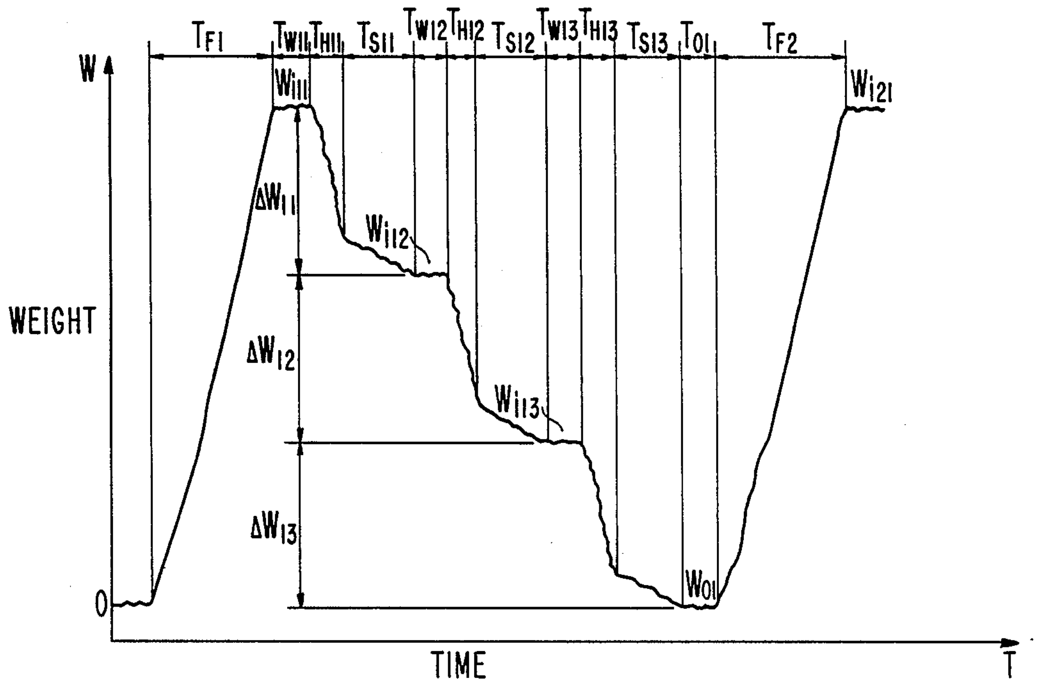
FIG. 3 is a diagram showing a second preferred embodiment of a method for filling liquid according to the present invention also by making use of the apparatus shown in FIG. 1.

(2) FIG. 3 illustrates a modified method in which for the purpose of further improving filling efficiency or carrying out filling of a small amount, initially liquid of the weight adapted to fill a number of containers 16 is filled into the metering container 25, and subsequently each time a container 16 is brought into or out of the filling position only filling of the liquid from the metering container 25 into the container 16 is effected.

More particularly, at first, a predetermined weight of the liquid 7 to be filled is fed to the metering container 25, and such fed weight is represented by $W_{i11}$. Depending upon a target weight to be filled into each container 16, liquid portions of the weights $\Delta W_{11}$, $\Delta W_{12}$, and $\Delta W_{13}$ are successively filled into a plurality of containers 16 in a manner similar to that illustrated in FIG. 2 and described above.

When the amount of the liquid 7 within the metering container 25 has been decreased to less than the amount to be filled into one container 16, additional liquid 7 is again filled into the metering container 25 so that the filled amount becomes $W_{i21}$ (See FIG. 3).

In the case of the last-mentioned method, if the operations of moving the containers 16 into and out of the filling position are sufficiently fast, filling of liquid into the containers 16 can be achieved efficiently.

With regard to the remainder of the operation, the above-described second method for filling liquid into containers is identical to the first method described previously with reference to FIG. 2.

In FIGS. 2 and 3, the respective time periods $T_{W1}$, $T_{O1}$ and $T_{W2}$; and $T_{W11}$, $T_{W12}$, $T_{W13}$ and $T_{O1}$ are stilling periods prepared for correctly sampling a measured weight.

The feed time periods $T_{F1}$ and $T_{F2}$ for filling the liquid 7 into the metering container 25 are the times necessary for the filled amounts of liquid 7 to equal the desired approximate target feed weights $W_{i1}$, $W_{i11}$ and $W_{i2}$, $W_{i21}$, respectively.

The operation of removal of a filled container 16 is effected in response to a filling completion signal issued from the control unit 23.

In the case where the metering container 25 is constructed as a sealed container, gases such as air, $CO_2$ gas, $N_2$ gas, etc. are fed through a pressurized gas feed port 27 from an apparatus not shown to maintain a predetermined pressure in the metering container 25, and thereby the flow rate of the liquid during filling can be enhanced.

In the above description of the filling methods shown in FIGS. 2 and 3, while a method in which the liquid flow rate is switched between two modes of quick filling and slow filling was explained, it is a matter of course that if necessary the filling of liquid could be carried out at one fixed flow rate.

As will be apparent from the above description of the preferred embodiments of the present invention, according to the present invention, the following advantages are attained:

(1) Even if properties of the liquid to be filled should change (density change caused by temperature change/liquid having gas or solid mixed therein/liquid whose viscosity is liable to change), a predetermined weight of liquid can be filled at a high precision.

(2) A predetermined weight of liquid to be filled can be filled into a container such as a bottle, a can or the like at a high precision regardless of the package weight of the container and without being subjected to dynamic influences due to conveyance of the containers.

(3) Filling of liquid can be performed continuously many times, and thereby filling efficiency and filling precision can be enhanced.

(4) If the metering container is sealed and pressurized, filling at a further high flow rate becomes possible.

While the principle of the pressure invention has been described above in connection with preferred embodiments of the invention, it is intended that all matter contained in the above description and illustrated in the accompanying drawings shall be interpreted to be illustrative and not limiting.

What is claimed is:

1. An apparatus for filling a predetermined weight of a liquid sequentially into each of a plurality of containers such as bottles, cans, or the like, said apparatus comprising:

a metering container having a liquid inlet for receiving liquid and a liquid outlet for discharging liquid;

weighing balance means, having placed thereon said metering container, for determining the weight of said metering container and any liquid therein and for generating signals representative thereof;

liquid feed control valve means, connected to said liquid inlet with a flexible pipe therebetween, for controlling the supply of liquid into said metering container;

liquid filling control valve means, connected to said liquid outlet with a flexible pipe therebetween, for controlling the discharge of liquid from said metering container;

conveyor means for sequentially positioning the containers beneath said liquid filling control valve means; and control unit means, operatively connected to said weighing balance means and to said liquid feed control valve means and said liquid filling control valve means, for, in response to said signals generated by said weighing balance means, opening and closing said liquid feed control valve means to thereby regulate the weight of liquid supplied into said metering container, and opening and closing said liquid filling control valve means to thereby regulate the weight of liquid discharged from said metering container into a container positioned by said conveyor means beneath said liquid filling control valve means.

2. An apparatus as claimed in claim 1, wherein the capacity of said metering container is at least equal to the sum of the capacities of a plural number of the containers to be filled, and said control unit means includes means for opening said liquid feed control valve means to supply to said metering container a weight of liquid equal to at least the weight of liquid to be supplied to said plural number of containers, for maintaining said liquid feed control valve means closed during the supply of liquid to said plural number of containers, and for again opening said liquid feed control valve means only when said signals generated by said weighing balance means indicate that the weight of liquid remaining in said metering container is less than the weight of liquid to be filled into one container.

3. An apparatus as claimed in claim 1, wherein said control unit means includes means for opening said liquid feed control valve means to supply liquid into said metering container after each operation of opening said liquid filling control valve means to discharge liquid from said metering container into each of the containers.

4. A method for filling a predetermined weight of a liquid sequentially into each of a plurality of containers such as bottles, cans, or the like, said method comprising:

providing a metering container, having a liquid inlet and a liquid outlet, placed on a weighing balance, and thereby determining the weight of said metering container and any liquid therein, and generating signals representative thereof;

providing a liquid feed control valve connected to said liquid inlet with a flexible pipe therebetween for controlling the supply of said liquid into said metering container, and providing a liquid filling control valve connected to said liquid outlet with a flexible pipe therebetween for controlling the discharge of said liquid from said metering container;

sequentially positioning said plurality of containers beneath said liquid filling control valve; and controlling, in response to said signals generated by said weighing balance, opening and closing of said liquid feed control valve and thereby regulating the weight of said liquid supplied into said metering container, and opening and closing of said liquid filling control valve and thereby regulating the weight of said liquid discharged from said metering container into each said container positioned beneath said liquid filling control valve.

5. A method as claimed in claim 4, further comprising providing the capacity of said metering container to be at least equal to the sum of the capacities of a plural number of said containers, and wherein said controlling comprises opening said liquid feed control valve and supplying to said metering container a weight of said liquid equal to at least the weight of said liquid to be supplied to said plural number of containers, maintaining said liquid feed control valve closed during the supply of liquid to said plural number of containers, and again opening said liquid feed control valve only when said signals generated by said weighing balance indicate that the weight of liquid remaining in said metering container is less than the weight of liquid to be filled into one container.

6. A method as claimed in claim 4, wherein said controlling comprises opening said liquid feed control valve to supply said liquid into said metering container after each operation of opening said liquid filling control valve to discharge said liquid from said metering container into each of said containers.

* * * * *